United States Patent
Takahashi et al.

(10) Patent No.: US 9,111,694 B2
(45) Date of Patent: Aug. 18, 2015

(54) ELECTROLYTE SOLUTION FOR ELECTRIC DOUBLE LAYER CAPACITOR

(75) Inventors: Kenzou Takahashi, Settsu (JP); Meiten Koh, Settsu (JP); Mai Koyama, Settsu (JP); Emi Yamamoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 178 days.

(21) Appl. No.: 13/882,584

(22) PCT Filed: Oct. 21, 2011

(86) PCT No.: PCT/JP2011/074316
§ 371 (c)(1),
(2), (4) Date: Apr. 30, 2013

(87) PCT Pub. No.: WO2012/063622
PCT Pub. Date: May 18, 2012

(65) Prior Publication Data
US 2013/0222976 A1    Aug. 29, 2013

(30) Foreign Application Priority Data

Nov. 10, 2010 (JP) .................................. 2010-252373
Feb. 22, 2011 (JP) .................................. 2011-036101

(51) Int. Cl.
| | | |
|---|---|---|
| *H01G 9/038* | (2006.01) | |
| *H01G 11/60* | (2013.01) | |
| *H01G 9/00* | (2006.01) | |
| *H01G 9/035* | (2006.01) | |
| *H01G 11/58* | (2013.01) | |
| *H01G 11/30* | (2013.01) | |

(52) U.S. Cl.
CPC .............. *H01G 11/60* (2013.01); *H01G 9/035* (2013.01); *H01G 9/155* (2013.01); *H01G 11/30* (2013.01); *H01G 11/58* (2013.01); *Y02E 60/13* (2013.01)

(58) Field of Classification Search
USPC ........... 252/62.2; 361/502; 429/326, 339, 341
See application file for complete search history.

(56) References Cited

U.S. PATENT DOCUMENTS

| | | |
|---|---|---|
| 5,754,393 A | 5/1998 | Hiratsuka et al. |
| 2007/0224516 A1* | 9/2007 | Deguchi et al. ............... 429/339 |
| 2010/0033899 A1 | 2/2010 | Koh et al. |

FOREIGN PATENT DOCUMENTS

| | | |
|---|---|---|
| JP | 08-306591 A | 11/1996 |
| JP | 2000-208372 A | 7/2000 |
| JP | 2001-143750 * | 5/2001 |
| JP | 2001-143750 A | 5/2001 |
| WO | 2008/084846 A1 | 7/2008 |

OTHER PUBLICATIONS

English Translation of International Preliminary Report on Patentability issued May 14, 2013, in PCT Application No. PCT/JP2011/074316.

* cited by examiner

*Primary Examiner* — Carol M Koslow
(74) *Attorney, Agent, or Firm* — Sughrue Mion, PLLC

(57) ABSTRACT

The present invention provides an electric double layer capacitor having a high withstanding voltage, less deterioration, and excellent long-term reliability, especially an effect of suppressing expansion. The present invention relates to an electrolyte solution for an electric double layer capacitor. The solution comprises an electrolyte-salt-dissolving solvent (I) and an electrolyte salt (II). The electrolyte-salt-dissolving solvent (I) contains a fluorine-containing chain ether and a nitrile compound.

5 Claims, No Drawings

ELECTROLYTE SOLUTION FOR ELECTRIC DOUBLE LAYER CAPACITOR

TECHNICAL FIELD

The present invention relates to an electrolyte solution for an electric double layer capacitor, and an electric double layer capacitor comprising the same.

BACKGROUND ART

An electrolyte-salt-dissolving solvent of an electric double layer capacitor, which has at least one polarizable electrode as one or both of a positive electrode and a negative electrode, is preferably stably used with a withstanding voltage of 3 V or higher. From this viewpoint, combination use of ethylene carbonate and propylene carbonate, which is a cyclic carbonate having a high oxidation potential (withstanding voltage), has been proposed (for example, see Patent Literature 1). The withstanding voltage obtainable by such combination, however, is limited to around 2.7 V at the highest.

Further, in order to improve the withstanding voltage, use of a non-aqueous solvent containing sulfolane or its derivative and specific carbonic acid chain ester (chain carbonate) (for example, see Patent Literature 2) is proposed, and in order to improve the safety, an electrolyte solution containing a specific electrolyte and fluorine-containing organic solvent in combination is proposed (for example, see Patent Literature 3).

CITATION LIST

Patent Literature

Patent Literature 1: JP 2000-208372 A
Patent Literature 2: JP 08-306591 A
Patent Literature 3: JP 2001-143750 A

SUMMARY OF INVENTION

Technical Problem

In the conventional techniques in Patent Literatures 1 and 2, however, the characteristics required for electric double layer capacitors, that is, high withstanding voltage and long life, are not necessarily achieved in a balanced manner. Especially, the electrolyte solution in Patent Literature 2 causes a high internal resistance of the capacitor, and thus should be further improved in long-term reliability. Further, the examples therein were performed only with small condensing devices in the form of coin-shaped cells, and the Literature provides no evaluation on rolled-up cells used for automobiles and in industrial applications, such as load leveling, electricity regeneration, and instant high-current supply.

Furthermore, the above conventional techniques do not particularly describe expansion of electric double layer capacitors. One object of the present invention is to provide an electric double layer capacitor with high withstanding voltage, less deterioration, and excellent long-term reliability, especially an effect of suppressing expansion.

Solution to Problem

The present invention relates to an electrolyte solution for an electric double layer capacitor, the solution comprising an electrolyte-salt-dissolving solvent (I) and an electrolyte salt (II), where the electrolyte-salt-dissolving solvent (I) contains a fluorine-containing chain ether and a nitrile compound.

The fluorine-containing chain ether is preferably a compound represented by the following formula:

wherein $Rf^1$ represents a C1-C10 fluoroalkyl group; and $Rf^2$ represents a C1-C4 alkyl group that may optionally contain a fluorine atom.

The fluorine-containing chain ether is preferably at least one selected from the group consisting of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$, and $CF_3CF_2CH_2OCH_2CFHCF_3$.

The nitrile compound is preferably a compound represented by the following formula:

$$R^1-(CN)_n$$

wherein $R^1$ represents a C1-C10 alkyl group or a C1-C10 alkylene group; and n is an integer of 1 or 2.

The nitrile compound is preferably at least one compound selected from the group consisting of acetonitrile, propionitrile, and glutaronitrile.

The ratio in volume between the nitrile compound and the fluorine-containing chain ether is preferably 10/90 to 99/1.

The electrolyte salt (II) is preferably a triethyl methylammonium salt, a tetraethyl ammonium salt, or a spirobipyridinium salt.

The present invention also relates to an electric double layer capacitor comprising the electrolyte solution, a positive electrode, and a negative electrode.

Advantageous Effects of Invention

The present invention can provide an electric double layer capacitor with high withstanding voltage, less deterioration, and excellent long-term reliability, especially an effect of suppressing expansion. Further, since the withstanding voltage is high, the capacity of energy to be stored is large. Thus, the present invention can also provide an electric double layer capacitor with high energy capacity.

DESCRIPTION OF EMBODIMENTS

The electrolyte solution for an electric double layer capacitor of the present invention comprises a predetermined electrolyte-salt-dissolving solvent (I) and electrolyte salt (II).

The predetermined electrolyte-salt-dissolving solvent (I) used in the present invention contains a fluorine-containing chain ether (Ia) and a nitrile compound (Ib).

Examples of the fluorine-containing chain ether (Ia) include compounds disclosed in JP 8-37024 A, JP 9-97627 A, JP 11-26015 A, JP 2000-294281 A, JP 2001-52737 A, and JP 11-307123 A.

Preferable among these as the fluorine-containing chain ether (Ia) is a fluorine-containing chain ether represented by the following formula (Ia-1):

wherein $Rf^1$ represents a C1-C10 fluoroalkyl group; and $Rf^2$ represents a C1-C4 alkyl group that may optionally contain a fluorine atom.

In the formula (Ia-1), $Rf^2$ is preferably a fluorine-containing alkyl group rather than a non-fluoroalkyl group in that the solvent with a fluorine-containing alkyl group has excellent oxidation resistance and compatibility with an electrolyte salt, as well as a high decomposition voltage and an ability to maintain its low-temperature characteristics owing to its low freezing point.

Examples of $Rf^1$ include C1-C10 fluoroalkyl groups such as $HCF_2CF_2CH_2-$, $HCF_2CF_2CF_2CH_2-$, $HCF_2CF_2CF_2CF_2CH_2-$, $C_2F_5CH_2-$, $CF_3CFHCF_2CH_2-$, $HCF_2CF(CF_3)CH_2-$, $C_2F_5CH_2CH_2-$, and $CF_3CH_2CH_2-$. Preferable among these are C3-C6 fluoroalkyl groups.

Examples of $Rf^2$ include C1-C4 non-fluoroalkyl groups, $-CF_2CF_2H$, $-CF_2CFHCF_3$, $-CF_2CF_2CF_2H$, $-CH_2CH_2CF_3$, $-CH_2CFHCF_3$, and $-CH_2CH_2C_2F_5$. Preferable among these are C2-C4 fluorine-containing alkyl groups.

In particular, it is preferable that $Rf^1$ is a C3-C4 fluorine-containing alkyl group and $Rf^2$ is C2-C3 fluorine-containing alkyl group in order to achieve good ionic conductivity.

Specific examples of the fluorine-containing chain ether (Ia) include one or two or more of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$, and $CF_3CF_2CH_2OCH_2CFHCF_3$. Particularly preferable among these are $HCF_2CF_2CH_2OCF_2CF_2H$, $HCF_2CF_2CH_2OCF_2CFHCF_3$, $CF_3CF_2CH_2OCF_2CFHCF_3$, and $CF_3CF_2CH_2OCF_2CF_2H$ in order to keep a high decomposition voltage and low-temperature characteristics.

The nitrile compound (Ib) may be, for example, a nitrile compound represented by the following formula (Ib-1):

$$R^1-(CN)_n \quad (Ib-1)$$

wherein $R^1$ represents a C1-C10 alkyl group or a C1-C10 alkylene group; and n is an integer of 1 or 2.

In the case that n is 1 in the formula (Ib-1), $R^1$ is a C1-C10 alkyl group, whereas in the case that n is 2, $R^1$ is a C1-C10 alkylene group.

Examples of the alkyl group include C1-C10 alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, and a decyl group. Preferable among these are a methyl group and an ethyl group.

Examples of the alkylene group include C1-C10 alkylene groups such as a methylene group, an ethylene group, a propylene group, a butylene group, a pentylene group, a hexylene group, an octylene group, a nonylene group, and a decylene group. Preferable among these are a propylene group and an ethylene group.

Specific examples of the nitrile compound (Ib) include acetonitrile ($CH_3-CN$), propionitrile ($CH_3-CH_2-CN$), and glutaronitrile ($NC-(CH_2)_3-CN$). Preferable among these are acetonitrile and propionitrile due to their low resistance.

The electrolyte-salt-dissolving solvent (I) used in the present invention may be any one containing the fluorine-containing chain ether (Ia) and the nitrile compound (Ib). In order to improve the long-term reliability, it may further contain a sulfolane compound.

The sulfolane compound may be a non-fluorosulfolane compound or may be a fluorine-containing sulfolane compound.

In addition to sulfolane, examples of the non-fluorosulfolane compound include a non-fluorosulfolane derivative represented by the formula:

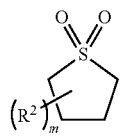

[Chem. 1]

wherein $R^2$ is a C1-C4 alkyl group; and m is an integer of 1 or 2.

Preferable among these are sulfolane and sulfolane derivatives as illustrated below.

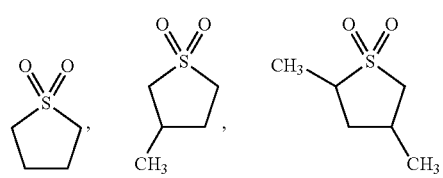

[Chem. 2]

Examples of the fluorine-containing sulfolane compound include fluorine-containing sulfolane compounds disclosed in JP 2003-132944 A. In particular, any of the compounds represented by the following formulas:

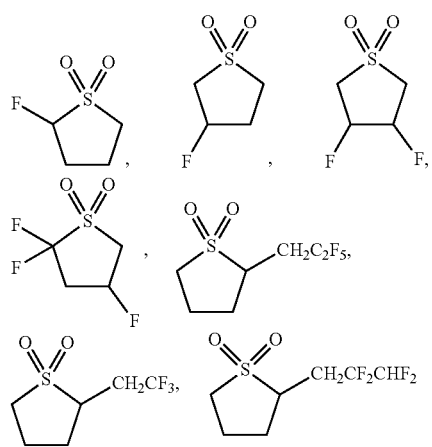

[Chem. 3]

are preferably used.

Preferable among these as the sulfolane compound are sulfolane, 3-methylsulfolane, and 2,4-dimethylsulfolane, and particularly sulfolane.

With respect to the electrolyte-salt-dissolving solvent (I) used in the electrolyte solution for an electric double layer capacitor of the present invention, combination use of the fluorine-containing chain ether (Ia) and the nitrile compound (Ib) leads to improvement in withstanding voltage of a capacitor, reduction in internal resistance, and improvement in long-term reliability, especially an effect of suppressing expansion of a capacitor.

The electrolyte-salt-dissolving solvent (I) may optionally contain other solvents such as a cyclic carbonate (Ic) and a chain carbonate (Id).

The cyclic carbonate (Ic) may be a non-fluorocyclic carbonate or may be a fluorine-containing cyclic carbonate.

Examples of the non-fluorocyclic carbonate include ethylene carbonate (EC), propylene carbonate (PC), and vinylene carbonate. Preferable among these is propylene carbonate (PC) in order to maintain the effect of reducing the internal resistance and to maintain the low-temperature characteristics.

Examples of the fluorine-containing cyclic carbonate include mono-, di-, tri-, and tetra-fluoroethylene carbonates, and trifluoromethyl ethylene carbonate. Preferable among these is trifluoromethyl ethylene carbonate for improvement in the withstanding voltage of a capacitor.

The chain carbonate (Id) may be a non-fluoro chain carbonate or may be a fluorine-containing chain carbonate.

Examples of the non-fluoro chain carbonate include dimethyl carbonate (DMC), diethyl carbonate (DEC), ethyl methyl carbonate (EMC), methyl isopropyl carbonate (MIPC), ethyl isopropyl carbonate (EIPC), and 2,2,2-trifluoroethyl methyl carbonate (TFEMC). Preferable among these is dimethyl carbonate (DMC) in order to maintain the effect of reducing the internal resistance and to maintain the low-temperature characteristics.

Examples of the fluorine-containing chain carbonate include:

a fluorine-containing chain carbonate represented by the following formula (Id-1):

[Chem. 4]

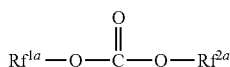

(Id-1)

wherein $Rf^{1a}$ is a fluoroalkyl group or an alkyl group, preferably a C1-C3 alkyl group, terminally having a moiety represented by the formula:

$(HCX^{1a}X^{2a})-$ [Chem. 5]

(wherein $X^{1a}$ and $X^{2a}$ may be the same as or different from each other, and represent a hydrogen atom or a fluorine atom) and preferably having a fluorine content of 10 to 76% by mass; and $Rf^{2a}$ represents a fluoroalkyl group terminally having a moiety represented by the above formula or $-CF_3$ and preferably having a fluorine content of 10 to 76% by mass;

a fluorine-containing chain carbonate represented by the following formula (Id-2):

[Chem. 6]

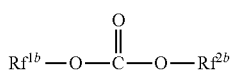

(Id-2)

wherein $Rf^{1b}$ is a fluorine-containing alkyl group terminally having $-CF_3$, having a fluorine content of 10 to 76% by mass, and having an ether bond; and $Rf^{2b}$ is an ether bond- and fluorine-containing alkyl group or a fluorine-containing alkyl group having a fluorine content of 10 to 76% by mass; and a fluorine-containing chain carbonate represented by the following formula (Id-3):

[Chem. 7]

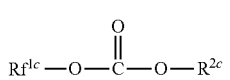

(Id-3)

wherein $Rf^{1c}$ is an ether bond- and fluorine-containing alkyl group terminally having a moiety represented by the formula:

$HCFX^{1c}-$ (wherein $X^{1c}$ represents a hydrogen atom or a fluorine atom) and having a fluorine content of 10 to 76% by mass; and $R^{2c}$ is an alkyl group in which a hydrogen atom may be replaced by a halogen atom and which may have a heteroatom in its chain.

Specific examples of the fluorine-containing chain carbonate to be used include chain carbonates with a fluorine-containing group, and are represented by the following formula (Id-4):

[Chem. 8]

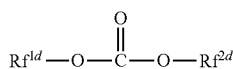

(Id-4)

wherein $Rf^{1d}$ and $Rf^{2d}$ each are $H(CF_2)_2CH_2-$, $FCH_2CF_2CH_2-$, $H(CF_2)_2CH_2CH_2-$, $CF_3CF_2CH_2-$, $CF_3CH_2CH_2-$, $CF_3CF(CF_3)CH_2CH_2-$, $C_3F_7OCF(CF_3)CH_2-$, $CF_3OCF(CF_3)CH_2-$, $CF_3OCF_2-$, and the like.

In order to maintain the effect of reducing the internal resistance and to maintain the low-temperature characteristics, preferable among the fluorine-containing chain carbonates are those represented by the following formulas.

[Chem. 9]

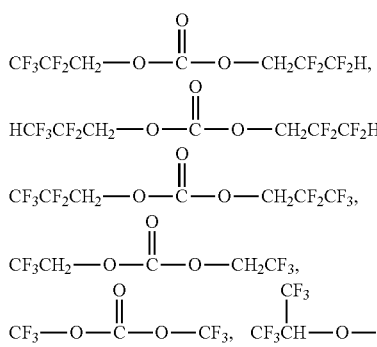

Further, any of the carbonates represented by the following formulas may also be used as the fluorine-containing chain carbonate.

[Chem. 10]

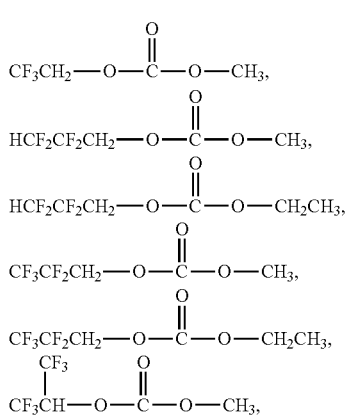

-continued

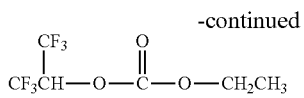

In addition to the cyclic carbonate (Ic) and the chain carbonate (Id), examples of a solvent to be mixed include:

fluorine-containing cyclic ethers such as those represented by the following formulas:

[Chem. 11]

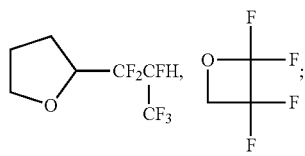

non-fluorolactones and fluorine-containing lactones represented by the following formulas:

[Chem. 12]

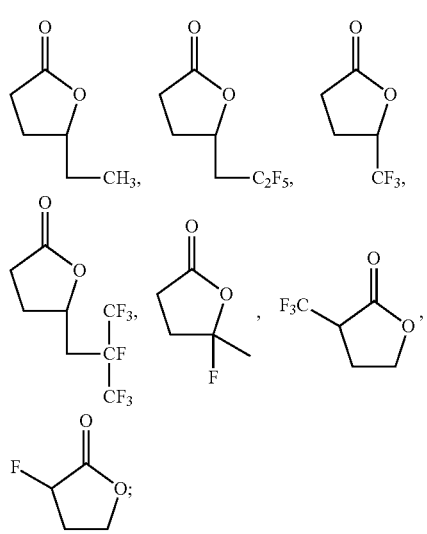

and furans and oxolanes.

The ratio in volume between the fluorine-containing chain ether (Ia) and the nitrile compound (Ib) is preferably 90/10 to 1/99, more preferably 40/60 to 1/99, and still more preferably 30/70 to 1/99. A ratio in volume within this range enables to maintain the withstanding voltage, to have an excellent effect of reducing the internal resistance, and to improve the effect of suppressing expansion.

The proportion in total of the fluorine-containing chain ether (Ia) and the nitrile compound (Ib) in the electrolyte-salt-dissolving solvent (I) is preferably 50 to 100% by volume, more preferably 60 to 100% by volume, and still more preferably 70 to 100% by volume.

In the case of mixing another solvent in addition to the fluorine-containing chain ether (Ia) and the nitrile compound (Ib) into the electrolyte-salt-dissolving solvent (I), the amount of the additional solvent is preferably less than 50% by volume, more preferably less than 40% by volume, and still more preferably less than 30% by volume in the electrolyte-salt-dissolving solvent (I).

In the case of adding the sulfolane compound to the electrolyte-salt-dissolving solvent (I), the amount of the sulfolane compound is preferably less than 50% by volume, more preferably less than 40% by volume, still more preferably less than 30% by volume, and particularly preferably less than 20% by volume, in the electrolyte-salt-dissolving solvent (I). The sulfolane compound in an amount within the above range is preferable in that it enables to improve the long-term reliability.

The following will describe the other component of the electrolyte solution used in the present invention, that is, the electrolyte salt (II).

Examples of the electrolyte salt (II) to be used in the present invention include conventional ammonium salts and metal salts, as well as liquid salts (ionic liquids), inorganic polymer salts, and organic polymer salts.

A particularly suitable compound may be selected from these electrolyte salts depending on the use of an electrolyte solution. For example, an ammonium salt may be mentioned as an electrolyte salt suitable for a capacitor; nevertheless, the salt is not limited to the exemplified salts including the ammonium salts. In the uses other than capacitors, any known electrolyte salt for such uses may be appropriately used.

The following will exemplify suitable ammonium salts as the electrolyte salt for a capacitor.

(IIA) Tetraalkyl Quaternary Ammonium Salt

Preferable examples thereof include a tetraalkyl quaternary ammonium salt represented by the formula (IIA):

[Chem. 13]

wherein $R^{1a}$, $R^{2a}$, $R^{3a}$, and $R^{4a}$ may be the same as or different from each other, and each are a C1-C6 alkyl group that may optionally have an ether bond; and $X^-$ is an anion. Further, it is also preferable that part or all of the hydrogen atoms in this ammonium salt is/are replaced by a fluorine atom and/or a C1-C4 fluorine-containing alkyl group because the oxidation resistance can be improved.

Specific examples thereof include:

a tetraalkyl quaternary ammonium salt represented by the formula (IIA-1):

[Chem. 14]

wherein $R^{1a}$, $R^{2a}$, and $X^-$ each are defined as in the formula (IIA); and x and y may be the same as or different from each other and each an integer of 0 to 4, provided that x+y=4; and an alkyl ether group-containing trialkyl ammonium salt represented by the formula (IIA-2):

[Chem. 15]

wherein $R^{5a}$ is a C1-C6 alkyl group; $R^{6a}$ is a divalent C1-C6 hydrocarbon group; $R^{7a}$ is a C1-C4 alkyl group; z is 1 or 2; and $X^-$ is an anion. Introduction of an alkyl ether group can reduce the viscosity.

The anion $X^-$ may be an inorganic anion or may be an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO^-$, $CF_3SO_3^-$, $(CF_3SO_2)_2N^-$, and $(C_2F_5SO_2)_2N^-$.

Preferable among these are $BF_4^-$, $PF_6^-$, $AsF_6^-$, and $SbF_6^-$ for good oxidation resistance and ionic dissociation.

Specific, preferable examples of the tetraalkyl quaternary ammonium salt include $Et_4NBF_4$, $Et_4NClO_4$, $Et_4NPF_6$, $Et_4NAsF_6$, $Et_4NSbF_5$, $Et_4NCF_3SO_3$, $Et_4N(CF_3SO_2)_2N$, $Et_4NC_4F_9SO_3$, $Et_3MeNBF_4$, $Et_3MeNClO_4$, $Et_3MeNPF_6$, $Et_3MeNAsF_6$, $Et_3MeNSbF_6$, $Et_3MeNCF_3SO_3$, $Et_3MeN(CF_3SO_2)_2N$, and $Et_3MeNC_4F_9SO_3$. Particularly preferable are $Et_4NBF_4$, $Et_4NPF_6$, $Et_4NSbF_6$, $Et_4NAsF_6$, $Et_3MeNBF_4$, and an N,N-diethyl-N-methyl-N-(2-methoxyethyl)ammonium salt.

(IIB) Spirobipyridinium Salt

Preferable examples thereof include a spirobipyridinium salt represented by the formula (IIB):

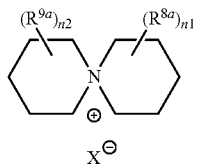

[Chem. 16]

wherein $R^{8a}$ and $R^{9a}$ may be the same as or different from each other, and each are a C1-C4 alkyl group; $X^-$ is an anion; n1 is an integer of 0 to 5; and n2 is an integer of 0 to 5. Further, it is also preferable that part or all of the hydrogen atoms in this spirobipyridinium salt is/are replaced by a fluorine atom and/or a C1-C4 fluorine-containing alkyl group because the oxidation resistance can be improved.

Specific, preferable examples of the anion $X^-$ are the same as those for the salt (IIA).

For example, the following compound:

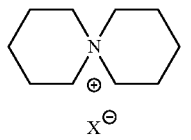

[Chem. 17]

may be mentioned as one preferable, specific example.

This spirobipyridinium salt is excellent in solubility, oxidation resistance, and ionic conductivity.

(IIC) Imidazolium Salt

Preferable examples thereof include an imidazolium salt represented by the formula (IIC):

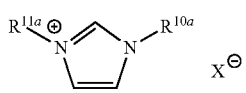

[Chem. 18]

wherein $R^{10a}$ and $R^{11a}$ may be the same as or different from each other, and each are a C1-C6 alkyl group; and $X^-$ is an anion. Further, it is also preferable that part or all of the hydrogen atoms in this imidazolium salt is/are replaced by a fluorine atom and/or a C1-C4 fluorine-containing alkyl group because the oxidation resistance can be improved.

Specific, preferable examples of the anion $X^-$ are the same as those for the salt (IIA).

For example, the following compound:

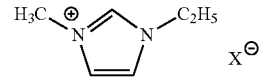

[chem. 19]

may be mentioned as one preferable, specific example.

This imidazolium salt is excellent in that it has low viscosity and good solubility.

(IID) N-Alkylpyridinium Salt

Preferable examples thereof include an N-alkylpyridinium salt represented by the formula (IID):

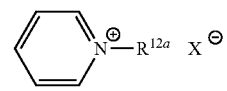

[Chem. 20]

wherein $R^{12a}$ is a C1-C6 alkyl group; and $X^-$ is an anion. Further, it is also preferable that part or all of the hydrogen atoms in this N-alkylpyridinium salt is/are replaced by a fluorine atom and/or a C1-C4 fluorine-containing alkyl group because the oxidation resistance can be improved.

Specific, preferable examples of the anion $X^-$ are the same as those for the salt (IIA).

For example, the following compounds:

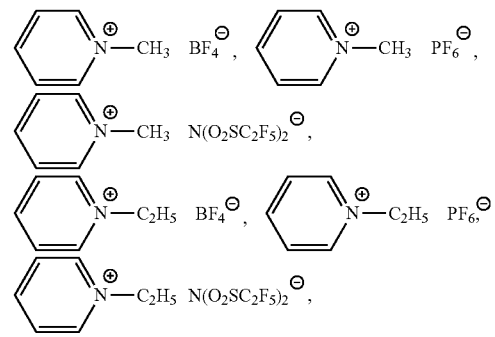

[Chem. 21]

may be mentioned as preferable, specific examples.

This N-alkylpyridinium salt is excellent in that it has low viscosity and good solubility.

(IIE) N,N-Dialkylpyrrolidinium Salt

Preferable examples thereof include an N,N-dialkylpyrrolidinium salt represented by the formula (IIE):

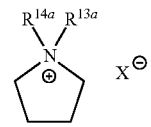

[Chem. 22]

wherein $R^{13a}$ and $R^{14a}$ may be the same as or different from each other, and each are a C1-C6 alkyl group; and $X^-$ is an anion. Further, it is also preferable that part or all of the hydrogen atoms in this N,N-dialkylpyrrolidinium salt is/are replaced by a fluorine atom and/or a C1-C4 fluorine-containing alkyl group because the oxidation resistance can be improved.

Specific, preferable examples of the anion X⁻ are the same as those for the salt (IIA).

For example, the following compounds:

[Chem. 23]

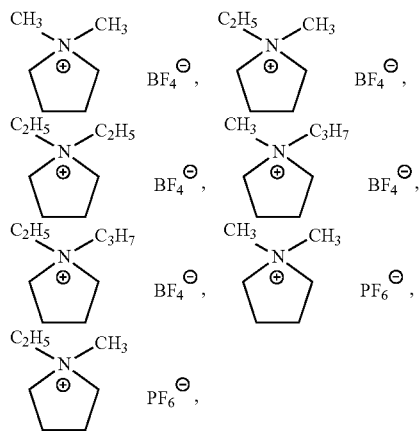

[Chem. 24]

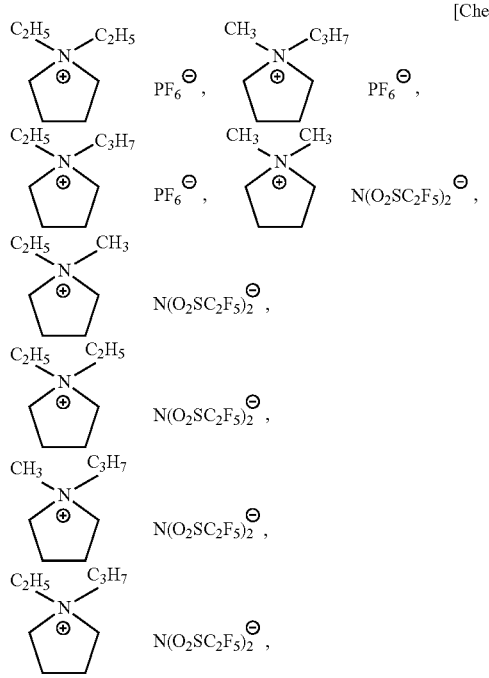

may be mentioned as preferable, specific examples.

This N,N-dialkylpyrrolidinium salt is excellent in that it has low viscosity and good solubility.

Preferable among these ammonium salts are salts (IIA), (IIB), and (IIC) for their good solubility, oxidation resistance, and ionic conductivity, and more preferable are compounds represented by the following formulas:

[Chem. 25]

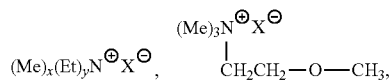

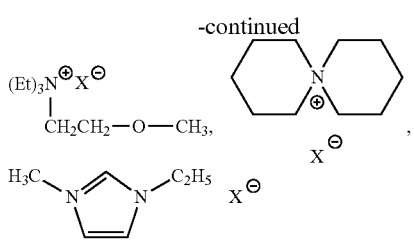

-continued

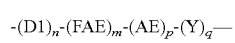

wherein Me represents a methyl group; Et represents an ethyl group; and X⁻, x, and y are the same as those defined in the formula (IIA-1).

A lithium salt may be used as the electrolyte salt. Preferable examples of the lithium salt include $LiPF_6$, $LiBF_4$, $LiAsF_6$, $LiSbF_6$, and $LiN(SO_2C_2H_5)_2$.

In order to further improve the capacity, a magnesium salt may be used. Preferable examples of the magnesium salt include $Mg(ClO_4)_2$ and $Mg(OOC_2H_5)_2$.

Preferable among these are spirobipyridinium tetrafluoroborate, triethyl methylammonium tetrafluoroborate, and tetraethyl ammonium tetrafluoroborate in order to maintain the low-temperature characteristics.

The concentration of the electrolyte salt (II) may depend on the required current density, use, type of the electrolyte salt, and the like. It is preferably 0.3 mol/l or higher, more preferably 0.5 mol/l or higher, and still more preferably 0.8 mol/l or higher. It is also preferably 3.6 mol/l or lower, more preferably 2.0 mol/l or lower, and still more preferably 1.6 mol/l or lower.

The electrolyte solution used in the present invention is prepared by dissolving the electrolyte salt (II) into the electrolyte-salt-dissolving solvent (I).

Further, the electrolyte solution in the present invention may be a gel electrolyte solution gelated (plasticized) in combination with a polymer material that is dissolved into a solvent used for the electrolyte solution of the present invention or is swelled by the solvent.

Examples of the polymer material include conventionally known polyethylene oxide and polypropylene oxide, modified products thereof (JP 8-222270 A, JP 2002-100405 A); polyacrylate-based polymers, polyacrylonitrile, and fluororesins such as polyvinylidene fluoride and vinylidene fluoride-hexafluoropropylene copolymers (JP 4-506726 T, JP 8-507407 T, JP 10-294131 A); and complexes of any of such fluororesins and any of hydrocarbon resins (JP 11-35765 A, JP 11-86630 A). In particular, it is preferable to use polyvinylidene fluoride or a vinylidene fluoride-hexafluoropropylene copolymer as a polymer material for a gel electrolyte solution.

In addition, an ion-conducting compound disclosed in JP 2006-114401 A may also be used.

This ion-conducting compound is an amorphous fluorine-containing polyether compound which has a fluorine-containing group in its side chain and which is represented by the formula (I-1):

$$P-(D)-Q \qquad (1\text{-}1)$$

wherein D is represented by the formula (2-1):

$$-(D1)_n\text{-}(FAE)_m\text{-}(AE)_p\text{-}(Y)_q- \qquad (2\text{-}1)$$

wherein

D1 is an ether unit which has, in its side chain, a fluorine-containing organic group having an ether bond and which is represented by the formula (2a):

[Chem. 26]

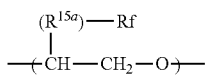
(2a)

(wherein Rf is a fluorine-containing organic group having an ether bond that may optionally have a cross-linkable functional group; and $R^{15a}$ is a group or an atomic bonding that couples Rf with the main chain);

FAE is an ether unit which has a fluorine-containing alkyl group in its side chain and which is represented by the formula (2b):

[Chem. 27]

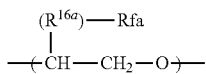
(2b)

(wherein Rfa is a hydrogen atom or a fluorine-containing alkyl group that may optionally have a cross-linkable functional group; and $R^{16a}$ is a group or an atomic bonding coupling Rfa with the main chain);

AE is an ether unit represented by the formula (2c):

[Chem. 28]

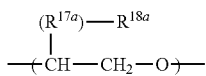
(2c)

(wherein $R^{18a}$ is a hydrogen atom or an alkyl group that may optionally have a cross-linkable functional group, an alicyclic hydrocarbon group that may optionally have a cross-linkable functional group, or an aromatic hydrocarbon group that may optionally have a cross-linkable functional group; and $R^{17a}$ is a group or an atomic bonding coupling $R^{18a}$ with the main chain);

Y is at least one unit represented by the formulas (2d-1) to (2d-3):

[Chem. 29]

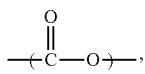
(2d-1)

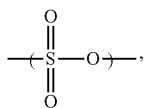
(2d-2)

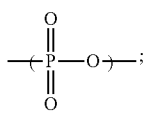
(2d-3)

n is an integer of 0 to 200; m is an integer of 0 to 200; p is an integer of 0 to 10000; and q is an integer of 1 to 100, provided that n+m is not 0, and the order of bonding of D1, FAE, AE, and Y is not defined); and P and Q may be the same as or different from each other, and each are a hydrogen atom, an alkyl group that may optionally contain a fluorine atom and/or a cross-linkable functional group, a phenyl group that may optionally contain a fluorine atom and/or a cross-linkable functional group, a —COOH group, —$OR^{19a}$ (wherein $R^{19a}$ is a hydrogen atom or an alkyl group that may optionally contain a fluorine atom and/or a cross-linkable functional group), an ester group, or a carbonate group (if the terminal of D is an oxygen atom, P and Q both are none of a —COOH group, —$OR^{19a}$, an ester group, and a carbonate group).

The electrolyte solution used in the present invention may contain another additive. Examples of such an additive include metal oxides and glass. These may be used to the extent that they do not deteriorate the effects of the present invention.

Preferably, the electrolyte solution used in the present invention does not freeze at low temperature (e.g., 0° C., −20° C.) and the electrolyte salt does not precipitate. Specifically, the viscosity at 0° C. is preferably 100 mPa·s or lower, more preferably 30 mPa·s or lower, and particularly preferably 15 mPa·s or lower. Further, specifically, the viscosity at −20° C. is preferably 100 mPa·s or lower, more preferably 40 mPa·s or lower, and particularly preferably 15 mPa·s or lower.

In the electric double layer capacitor of the present invention, at least one of the positive electrode and the negative electrode is preferably a polarizable electrode. The polarizable electrode and the non-polarizable electrode may be the following electrodes specifically disclosed in JP 9-7896 A.

The polarizable electrode may be a polarizable electrode mainly based on active carbon, and it preferably contains inactive carbon with a large specific surface area and a conducting agent which imparts electronic conductivity, such as carbon black. The polarizable electrode can be formed by various methods. For example, a polarizable electrode comprising active carbon and carbon black can be formed by mixing powdery active carbon, carbon black, and a phenolic resin, press-molding the mixture, and then firing and activating the mixture in an inert gas atmosphere and in a vapor atmosphere. Preferably, this polarizable electrode is coupled with a current collector using a conductive adhesive, for example.

Alternatively, a polarizable electrode may be formed by kneading powdery active carbon, carbon black, and a binder in the presence of an alcohol, forming the mixture into a sheet, and then drying the sheet. This binder may be polytetrafluoroethylene, for example. Alternatively, a polarizable electrode integrated with a current collector may be formed by mixing powdery active carbon, carbon black, a binder, and a solvent into a slurry, coating this slurry onto a metal foil of a current collector, and drying the coating.

A polarizable electrode mainly based on active carbon may be used for both electrodes to prepare an electric double layer capacitor. Further, a structure in which a non-polarizable electrode is used on one side may be accepted. Examples thereof include a structure in which a positive electrode mainly based on a cell active material such as a metal oxide and a negative electrode of a polarizable electrode mainly based on active carbon are used in combination; and a structure in which a negative electrode mainly based on a carbon material that can reversibly occlude and remove lithium ions or a negative electrode of metallic lithium or a lithium alloy and a polarizable electrode mainly based on active carbon are used in combination.

In place of or in combination with active carbon, a carbonaceous material may be used such as carbon black, graphite, expanded graphite, porous carbon, carbon nanotube, carbon nanohorn, and Ketjenblack.

The non-polarizable electrode is preferably based on a carbon material that can reversibly occlude and remove lithium ions, and a substance prepared by making this carbon material occlude lithium ions is used for an electrode. In this case, a lithium salt is used as the electrolyte. An electric double layer capacitor with such a structure can have a higher withstanding voltage exceeding 4 V.

The solvent used for the preparation of a slurry in the production of an electrode is preferably one dissolving a binder. The solvent is appropriately selected from N-methylpyrrolidone, dimethyl formamide, toluene, xylene, isophorone, methyl ethyl ketone, ethyl acetate, methyl acetate, dimethyl phthalate, ethanol, methanol, butanol, and water depending on the type of binder.

Examples of the active carbon used for a polarizable electrode include phenol resin-based active carbon, coconut shell-based active carbon, and petroleum coke-based active carbon. Preferably used among these are petroleum coke-based active carbon and phenol resin-based active carbon because they provide a large capacity. Further, examples of a method for activating active carbon include a vapor activation method and a molten KOH activation method. It is preferable to use active carbon prepared by the molten KOH activation method for a larger capacity.

Examples of a preferable conducting agent used for a polarizable electrode include carbon black, Ketjenblack, acetylene black, natural graphite, artificial graphite, metal fibers, conductive titanium oxide, and ruthenium oxide. The amount of the conducting agent, such as carbon black, used for a polarizable electrode is preferably 1 to 50% by mass in the total amount of the conducting agent and the active carbon because such an amount of the conducting agent may provide good conductivity (low internal resistance), and a larger amount of the conducting agent may cause a reduced capacity of a product.

The active carbon used for a polarizable electrode is preferably active carbon with an average particle size of 20 μm or smaller and a specific surface area of 1500 to 3000 $m^2/g$ in order to provide a large-capacity electric double layer capacitor with a low internal resistance. Further, preferable examples of the carbon material for constituting an electrode mainly based on a carbon material that can reversibly occlude and remove lithium ions include natural graphite, artificial graphite, graphitized meso-carbon spherules, graphitized whiskers, vapor-grown carbon fibers, baked products of a furfuryl alcohol resin, and baked products of a novolak resin.

The current collector needs to chemically and electrochemically resist corrosion. Preferable examples of the current collector of the polarizable electrode mainly based on active carbon include stainless steel, aluminum, titanium, and tantalum. Particularly preferable materials among these are stainless steel and aluminum in terms of both the characteristics and price of an electric double layer capacitor to be obtained. Preferable examples of the current collector of the electrode mainly based on a carbon material that can reversibly occlude and remove lithium ions include stainless steel, copper, and nickel.

Examples of the method for allowing a carbon material that can reversibly occlude and remove lithium ions to preliminarily occlude lithium ions include: (1) a method in which powdery lithium is mixed with a carbon material that can reversibly occlude and remove lithium ions; (2) a method in which a lithium foil is placed on an electrode formed by a binder and a carbon material that can reversibly occlude and remove lithium ions, this electrode is immersed in an electrolyte solution containing a lithium salt dissolved therein in a state that the foil and the electrode are in electrical contact, and thereby lithium is ionized and the lithium ions are taken into the carbon material; and (3) a method in which an electrode formed by a binder and a carbon material that can reversibly occlude and remove lithium ions is placed on the minus side, whereas metallic lithium is placed on the plus side, they are immersed in a non-aqueous electrolyte solution with a lithium salt used as an electrolyte, and then a current is applied so that ionized lithium is electrochemically taken into the carbon material.

Examples of commonly known electric double layer capacitors include rolled-up electric double layer capacitors, laminate electric double layer capacitors, and coin-shaped electric double layer capacitors, and the electric double layer capacitor of the present invention may have any of these structures.

For example, a rolled-up electric double layer capacitor may be produced as follows: a positive electrode and a negative electrode each having a laminate (electrode) of a current collector and an electrode layer are rolled up with a separator interposed therebetween to form a rolled-up element; this rolled-up element is put into a container made of, for example, aluminum; the container is charged with an electrolyte solution, preferably a non-aqueous electrolyte solution; and then the container is hermetically sealed with a rubber sealing material.

With respect to the separator, conventionally known materials and structures may also be used in the present invention. Examples thereof include polyethylene porous membrane and nonwoven fabric of polypropylene fibers, glass fibers, and cellulose fibers.

Alternatively, an electric double layer capacitor may be prepared, by a known method, as a laminate electric double layer capacitor in which sheet-shaped positive and negative electrodes are laminated with an electrolyte solution and a separator interposed therebetween, or a coin-shaped electric double layer capacitor in which a positive electrode and a negative electrode are fixed in a coin shape using a gasket with an electrolyte solution and a separator interposed therebetween.

In addition to the electric double layer capacitor, the electrolyte solution of the present invention may also be useful for electrolyte solutions of various electrochemical devices containing an electrolyte solution. Examples of the electrochemical devices include lithium secondary cells, radical batteries, solar cells (especially, dye-sensitized solar cells), fuel cells, various electrochemical sensors, electrochromic elements, electrochemical switching elements, aluminum electrolytic capacitors, and tantalum electrolytic capacitors, and particularly preferable are lithium secondary cells. Furthermore, the electrolyte solution may also be used as an ion conducting material of antistatic coating materials, for example.

EXAMPLES

The following will describe the present invention referring to, but not limited to, examples and comparative examples.

The following measurement methods were used in the examples and comparative examples.

(1) Solids Concentration of Aqueous Dispersion or Organosol

An aqueous dispersion or an organosol of PTFE (10 g), for example, was collected in a Petri dish and heated at 150° C. for about three hours. Then, the solids content was weighed.

Based on this solids content, the solids concentration was calculated as the ratio between the mass and the solids content of the aqueous dispersion or organosol.

(2) Average Particle Size

The solids content of a PTFE aqueous dispersion was adjusted to 0.15% by mass and the dispersion was charged into a cell. Then, 550-nm light was applied thereto, and thereby the transmittance at that time was determined. Further, the number average primary particle size was calculated based on the unidirectional particle diameter measured using a photograph by a transmission electron microscope. The correlation between the transmittance and the number average primary particle size was drawn into a calibration curve, and the average particle size was determined based on the obtained calibration curve and the transmittance measured for each sample.

(3) Standard Specific Gravity [SSG]

The SSG was measured by a water displacement method in accordance with ASTM D4895-89.

(4) Polymer Melting Point

A sample (3 mg) was subjected to measurement using a DSC device (SEIKO Holdings Corp.). The sample was heated to not lower than the melting point at an increasing rate of 10° C./min and then cooled down at the same rate, and again heated at the same rate as a second run. The melting peak in the second run was read, and this peak was defined as a melting point.

(5) Measurement of Compositional Ratio Between PTFE Particles and PVdF Particles in Organosol Composition by Solid-State NMR The organosol composition was vacuum-dried at 120° C., and the obtained sample was determined using a solid-state NMR device (BRUKER Corp.). The compositional ratio was calculated based on the ratio in area between the PTFE-derived peak and the PVdF-derived peak in the obtained spectrum.

Preparation 1

Preparation of Aqueous Dispersion of PTFE Particles

A 6-L-capacity SUS-made polymerization vessel equipped with a stirrer was charged with 3500 g of a solution obtained by dissolving an emulsifier $CF_3OCF(CF_3)CF_2OCF(CF_3)COONH_4$ in pure water to a concentration of 0.15% by mass and granular paraffin wax (100 g), and was then hermetically sealed. The atmosphere in the vessel was evacuated and replaced with nitrogen, and the vessel was then evacuated. Thereafter, tetrafluoroethylene (TFE) was put into the vessel until the pressure reached 0.7 MPaG while the mixture was stirred at 85° C. and 265 rpm. Next, a solution (20 g) of disuccinic acid peroxide (DSP) (525 mg) in water was injected under pressure into the vessel with nitrogen. In order to prevent the solution from remaining in the reaction pipe, water (20 g) was again injected under pressure into the pipe with nitrogen to wash the pipe. Then, the TFE pressure was adjusted to 0.8 MPa, and the stirring rate was maintained at 265 rpm and the internal temperature was maintained at 85° C. One hour after the DSP introduction, ammonium persulfate (APS) (19 mg) was dissolved in pure water (20 g), and the solution was injected under pressure into the vessel with nitrogen. In order to prevent the solution from remaining in the reaction pipe, water (20 g) was again injected under pressure into the pipe with nitrogen to wash the pipe. TFE was additionally put into the vessel to maintain the internal pressure at 0.8 MPa. When the amount of the additional monomer reached 1195 g, stirring was stopped. Then, the gas inside the vessel was blown and the reaction was terminated. The inside of the vessel was cooled down and the content was collected in a plastic container, and thereby an aqueous dispersion of PTFE particles was obtained. The solids concentration of the aqueous dispersion measured by a dry weight method was 31.4% by mass. Further, the average primary particle size of the aqueous dispersion was 0.29 μm.

The standard specific gravity and the melting point were measured as follows: the obtained aqueous dispersion of PTFE particles (500 ml) was diluted to have a solids concentration of about 15% by mass using deionized water; nitric acid (1 ml) was added and the mixture was stirred hard until coagulation; the obtained coagulation product was dried at 145° C. for 18 hours, and thereby PTFE powder was obtained. With respect to the obtained PTFE powder, the standard specific gravity [SSG] was 2.189 and the melting point analyzed by DSC was 325.9° C.

Preparation 2

Preparation of Aqueous Dispersion of TFE-HFP-VdF Copolymer

A 3-L-capacity SUS-made polymerization vessel with a stirrer was charged with a solution obtained by dissolving $F(CF_2)_5COONH_4$ and $CH_2=CFCF_2OCF(CF_3)CF_2OCF(CF_3)COONH_4$ in pure water to concentrations of 3300 ppm and 200 ppm, respectively, and was then hermetically sealed. The atmosphere in the vessel was evacuated and replaced with nitrogen, and the vessel was then evacuated. Further, ethane as a chain transfer agent in an amount equivalent to 400 cc was charged using a syringe under vacuum. Thereafter, while the mixture was stirred at 70° C. and 450 rpm, a gaseous monomer mixture of VdF/TFE/HFP at a compositional ratio of 50/38/12 mol % was charged into the vessel until the pressure reached 0.39 MPaG. Next, a solution of APS (137.2 mg) in water (10 g) was injected under pressure into the vessel with nitrogen, and thereby reaction was started. In order to prevent the solution from remaining in the reaction pipe, water (10 g) was again injected under pressure into the pipe with nitrogen.

A monomer mixture of VdF/TFE/HFP with a compositional ratio of 60/38/2 mol % was additionally put so as to keep the pressure in the vessel. When the amount of the additional monomer reached 346 g, the stirring rate is reduced to low, the gas inside the vessel was blown, and thereby the reaction was finished. The inside of the vessel was cooled down, and an aqueous dispersion of a VdF/TFE/HFP copolymer (hereinafter, referred to as THV) particles (1708 g) was collected in a container. The solids concentration of the aqueous dispersion by a dry weight method was 20.4% by mass. The copolymer composition by NMR analysis was VdF/TFE/HFP=59.0/38.9/2.1 (mol %), and the melting point by DSC analysis was 145.9° C.

Preparation 3

Preparation of PTFE/THV Organosol

The aqueous dispersion of PTFE particles (40.0 g) obtained in Preparation 1, the aqueous dispersion of THV particles (41.0 g) obtained in Preparation 2, and hexane (16 g) were put into a 200-mL beaker, and were stirred using a mechanical stirrer. Acetone (90 g) was added under stirring, and then the mixture was stirred for four minutes. After the stirring, the generated coagulum and supernatant liquid mainly containing water were filtered to be separated out. The remaining water-containing coagulum was mixed with dimethylacetamide (DMAC) (about 190 g), and the mixture was stirred for 30 minutes. The resulting mixture was put into a 500-ml recovery flask, and then the water was removed with an evaporator. Thereby, 158 g of an organosol containing PTFE particles uniformly dispersed in DMAC. The solids concentration in the organosol was 12.0% by mass, and the water concentration measured by the Karl Fischer method was not higher than 100 ppm. The ratio in weight of PTFE/ THV measured by solid-state NMR was 61/39. Further, this organosol was left standing and visually observed, and neither separated layers nor particles were observed even after 10 days or longer.

Example 1

(Production of Electrode)

Active carbon particles (100 parts by weight) (RP20, KURARAY CHEMICAL CO., LTD.), acetylene black (3 parts by weight) (DENKA BLACK FX-35, DENKI KAGAKU KOGYO KABUSHIKI KAISHA) as a conductive additive, Ketjenblack (12 parts by weight) (CARBON ECP600JD, Lion Corp.), a PVdf binder (8 parts by weight) (KF-7200, KUREHA CORP.), and the organosol (dispersing solution of PTFE and THV) obtained in Preparation 3 (solids content equivalent to 2 parts by weight) were mixed to prepare a slurry for an electrode.

An etched aluminum (20CB, JAPAN CAPACITOR INDUSTRIAL CO., LTD., thickness: about 20 μm) was prepared as a current collector. The respective surfaces of this current collector were coated with a conductive coating (Varniphite T602, Nippon Graphite Industries, ltd.) using a coating device, and thereby conductive layers (thickness: 7 μm) were formed.

Then, the slurry for an electrode prepared above was coated on the conductive layers formed on the respective surfaces of the current collector to form electrode layers (positive electrode thickness: 103 μm, negative electrode thickness: 83 μm) on the respective surfaces, and thereby an electrode was produced.

Hereinafter, the current collector, the conductive layers, and the active carbon layers are collectively referred to as an electrode.

(Production of Rolled-Up Cell)

The produced electrode was cut into a width of 30 mm, and then was rolled up using an EDLC rolling-up device together with a separator which was prepared by cutting TF45-30 (NIPPON KODOSHI CORP.) into a width of 34 mm. At that time, the electrode was caulk-coupled with a tab lead for electrode leading, and thereby a 16-mm-diameter cylindrical rolled-up product was produced.

The cylindrical rolled-up product, a cylindrical aluminum case, and a rubber packing were vacuum-dried, and the cylindrical rolled-up product was inserted into the cylindrical aluminum case in a drying chamber. Then, an electrolyte solution to be described below was charged thereinto and sealed with the rubber packing. Thereby, a rolled-up cell-type (φ18 mm×40 mm) electric double layer capacitor was produced.

(Production of Laminated Cell Electric Double Layer Capacitor)

The electrode was cut into a predetermined size (20×72 mm). The electrode-leading lead was weld-bonded to the aluminum face of the current collector and the workpiece was stored in a laminate container (product number: D-EL40H, manufacturer: Dai Nippon Printing Co., Ltd.). The separator was inserted therebetween and an electrolyte solution was injected into the container so that the workpiece was impregnated with the solution in the dry chamber. Then, the container was sealed, and thereby a laminated cell was produced. The separator used was one mentioned above.

(Preparation of Electrolyte Solution-1)

Acetonitrile and $HCF_2CF_2CH_2OCF_2CF_2H$ were mixed at a ratio in volume of 80/20 to prepare an electrolyte-salt-dissolving solvent. To this electrolyte-salt-dissolving solvent was added triethyl methylammonium tetrafluoroborate $(TEMA)BF_4$ so as to have a concentration of 1.2 mol/l, and the substance was uniformly dissolved into the solvent.

(Evaluation on Characteristics of Capacitor)

The obtained electric double layer capacitor was evaluated for its long-term reliability (capacitance retention, rate of increase in internal resistance, expansion coefficient). Tables 1 and 2 show the results.

(1) Capacitance Retention, Rate of Increase in Internal Resistance The rolled-up cell-type capacitor was put into a constant-temperature container at 60° C., and then a voltage (3.0 V) was applied thereto for 500 hours to measure the capacitance and internal resistance. The measurement timings were initial (0 hours), 291 hours, and 500 hours. Also, the laminated-type capacitor was put into a constant-temperature container at 60° C., and a voltage (3.0 V) was applied thereto for 500 hours to measure the capacitance and internal resistance. The measurement timings were initial (0 hours), 294 hours, 356 hours, and 500 hours. The capacitance retention (%) and rate of increase in internal resistance were calculated by the following formulas based on the obtained measurement values.

$$\text{Capacitance retention (\%)} = \frac{\text{Capacitance at each timing}}{\text{Capacitance before evaluation (initial)}} \times 100 \quad [\text{Math. 1}]$$

$$\text{Rate of increase in internal resistance} = \frac{\text{Internal resistance at each timing}}{\text{Internal resistance before evaluation (initial)}} \quad [\text{Math. 2}]$$

Those having a capacitance retention of 70% or higher after 500 hours and having a rate of increase in internal resistance of twice or lower are excellent in load characteristics at 60° C., also excellent in cycle characteristics and rate characteristics at normal temperature, and have long-term reliability.

(2) Measurement of Expansion

The case of a rolled-up cell before a long-term reliability test was measured in the height direction.

With respect to this measured value, the degree of expansion was measured. The initial height was 41±0.2 mm. Also, the laminated cell was measured in the thickness direction. With respect to this measured value, the degree of expansion was measured. The initial thickness was 0.58±0.02 mm.

Comparative Example 1

Acetonitrile was used as an electrolyte-salt-dissolving solvent. To this electrolyte-salt-dissolving solvent was added tetraethyl ammonium tetrafluoroborate $(TEA)BF_4$ so as to have a concentration of 1.0 mol/l, and the substance was uniformly dissolved into the solvent. The obtained solution was used as an electrolyte solution. With respect to the rolled-up cell-type and laminated-type electric double layer capacitors produced in the same manner as in Example 1, the respective evaluations were performed in the same manner as in Example 1. Tables 1 and 2 show the results.

TABLE 1

(Rolled-up cell-type capacitor)

| | | 0 hours (initial) | 291 hours | 500 hours |
|---|---|---|---|---|
| Example 1 | Capacitance (F) | 59 | 52 | 50 |
| | Capacitance retention (%) | 100 | 88 | 84 |
| | Internal resistance (mΩ) | 14 | 19 | 20 |
| | Rate of increase in internal resistance | 1.0 | 1.4 | 1.5 |
| | Cell height (mm) | 41.1 | 42.0 | 42.6 |
| | Expansion (mm) | 0 | 0.9 | 1.5 |
| Comparative Example 1 | Capacitance (F) | 59 | 55 | 52 |
| | Capacitance retention (%) | 100 | 93 | 88 |
| | Internal resistance (mΩ) | 14 | 14 | 15 |
| | Rate of increase in internal resistance | 1.0 | 1.0 | 1.1 |
| | Cell height (mm) | 41.3 | 43.0 | 44.0 |
| | Expansion (mm) | 0 | 1.7 | 2.7 |

TABLE 2

(Laminated-type capacitor)

| | | 0 hours (initial) | 294 hours | 356 hours | 500 hours |
|---|---|---|---|---|---|
| Example 1 | Capacitance (F) | 3.9 | 3.6 | 3.5 | 3.4 |
| | Capacitance retention (%) | 100 | 92 | 89 | 88 |
| | Internal resistance (mΩ) | 140 | 140 | 154 | 168 |
| | Rate of increase in internal resistance | 1.0 | 1.0 | 1.1 | 1.2 |
| | Cell thickness (mm) | 0.5800 | 0.5806 | 0.5874 | 0.5890 |
| | Expansion (mm) | 0 | 0.0006 | 0.0074 | 0.0090 |
| Comparative Example 1 | Capacitance (F) | 3.9 | 3.6 | 3.5 | 3.4 |
| | Capacitance retention (%) | 100 | 93 | 89 | 88 |
| | Internal resistance (mΩ) | 140 | 145 | 147 | 154 |
| | Rate of increase in internal resistance | 1.0 | 1.0 | 1.0 | 1.1 |
| | Cell thickness (mm) | 0.5800 | 0.5811 | 0.5944 | 0.598 |
| | Expansion (mm) | 0 | 0.0011 | 0.0144 | 0.0180 |

Example 2

(Preparation of Electrolyte Solution-2)

Acetonitrile and $HCF_2CF_2CH_2OCF_2CF_2H$ were mixed at a ratio in volume of 95/5 to prepare an electrolyte-salt-dissolving solvent. To this electrolyte-salt-dissolving solvent was added triethyl methylammonium tetrafluoroborate (TEMA)$BF_4$ so as to have a concentration of 1.2 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 1. The obtained electric double layer capacitor was evaluated for its long-term reliability (capacitance retention, rate of increase in internal resistance, expansion coefficient). Table 3 shows the results.

Example 3

(Preparation of Electrolyte Solution-3)

Acetonitrile and $HCF_2CF_2CH_2OCF_2CF_2H$ were mixed at a ratio in volume of 90/10 to prepare an electrolyte-salt-dissolving solvent. To this electrolyte-salt-dissolving solvent was added triethyl methylammonium tetrafluoroborate (TEMA)$BF_4$ so as to have a concentration of 1.2 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 1. The obtained electric double layer capacitor was evaluated for its long-term reliability (capacitance retention, rate of increase in internal resistance, expansion coefficient). Table 3 shows the results.

Example 4

Preparation of Electrolyte Solution-4)

Acetonitrile and $HCF_2CF_2CH_2OCF_2CF_2H$ were mixed at a ratio in volume of 70/30 to prepare an electrolyte-salt-dissolving solvent. To this electrolyte-salt-dissolving solvent was added triethyl methylammonium tetrafluoroborate (TEMA)$BF_4$ so as to have a concentration of 1.2 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 1. The obtained electric double layer capacitor was evaluated for its long-term reliability (capacitance retention, rate of increase in internal resistance, expansion coefficient). Table 3 shows the results.

Example 5

Preparation of Electrolyte Solution-5)

Acetonitrile and $HCF_2CF_2CH_2OCF_2CF_2H$ were mixed at a ratio in volume of 90/10 to prepare an electrolyte-salt-dissolving solvent. To this electrolyte-salt-dissolving solvent was added triethyl methylammonium tetrafluoroborate (TEMA)$BF_4$ so as to have a concentration of 1.3 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 1. The obtained electric double layer capacitor was evaluated for its long-term reliability (capacitance retention, rate of increase in internal resistance, expansion coefficient). Table 3 shows the results.

TABLE 3

|  |  | 0 hours (initial) | 294 hours | 356 hours | 500 hours |
|---|---|---|---|---|---|
| Example 2 | Capacitance (F) | 3.9 | 3.6 | 3.5 | 3.4 |
|  | Capacitance retention (%) | 100 | 92 | 89 | 88 |
|  | Internal resistance (mΩ) | 140 | 143 | 150 | 160 |
|  | Rate of increase in internal resistance | 1.0 | 1.0 | 1.1 | 1.1 |
|  | Cell thickness (mm) | 0.5800 | 0.5809 | 0.5903 | 0.5910 |
|  | Expansion (mm) | 0.0000 | 0.0009 | 0.0103 | 0.0110 |
| Example 3 | Capacitance (F) | 3.9 | 3.6 | 3.5 | 3.4 |
|  | Capacitance retention (%) | 100 | 92 | 89 | 88 |
|  | Internal resistance (mΩ) | 140 | 143 | 152 | 163 |
|  | Rate of increase in internal resistance | 1.0 | 1.0 | 1.1 | 1.2 |
|  | Cell thickness (mm) | 0.5800 | 0.5808 | 0.5894 | 0.5900 |
|  | Expansion (mm) | 0.0000 | 0.0008 | 0.0094 | 0.0100 |
| Example 4 | Capacitance (F) | 3.9 | 3.6 | 3.5 | 3.4 |
|  | Capacitance retention (%) | 100 | 92 | 89 | 88 |
|  | Internal resistance (mΩ) | 140 | 144 | 160 | 174 |
|  | Rate of increase in internal resistance | 1.0 | 1.0 | 1.1 | 1.2 |
|  | Cell thickness (mm) | 0.5800 | 0.5804 | 0.5864 | 0.5880 |
|  | Expansion (mm) | 0.0000 | 0.0004 | 0.0064 | 0.0080 |
| Example 5 | Capacitance (F) | 3.9 | 3.6 | 3.5 | 3.4 |
|  | Capacitance retention (%) | 100 | 92 | 89 | 88 |
|  | Internal resistance (mΩ) | 140 | 143 | 152 | 163 |
|  | Rate of increase in internal resistance | 1.0 | 1.0 | 1.1 | 1.2 |
|  | Cell thickness (mm) | 0.5800 | 0.5807 | 0.5895 | 0.5902 |
|  | Expansion (mm) | 0.0000 | 0.0007 | 0.0095 | 0.0102 |

Example 6

(Preparation of Electrolyte Solution-6)

Propionitrile, sulfolane, and $HCF_2CF_2CH_2OCF_2CF_2H$ were mixed at a ratio in volume of 70/10/20 to prepare an electrolyte-salt-dissolving solvent. To this electrolyte-salt-dissolving solvent was added triethyl methylammonium tetrafluoroborate (TEMA)$BF_4$ so as to have a concentration of 1.2 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 1. Then, the obtained electric double layer capacitor was evaluated for its long-term reliability (capacitance retention, rate of increase in internal resistance, expansion coefficient) as follows. Table 4 shows the results.

(1) Capacitance Retention, Rate of Increase in Internal Resistance

The laminated-type capacitor was put into a constant-temperature container at a temperature of 70° C., and then a voltage (3.0 V) was applied thereto for 500 hours to measure the capacitance and internal resistance. The measurement timings were initial (0 hours), 294 hours, 356 hours, and 500 hours. The capacitance retention (%) and rate of increase in internal resistance were calculated based on the obtained measurement values in the same manner as in Example 1.

(2) Measurement of Expansion

Expansion was measured by the same method as in Example 1.

TABLE 4

|  |  | 0 hours (initial) | 294 hours | 356 hours | 500 hours |
|---|---|---|---|---|---|
| Example 6 | Capacitance (F) | 3.9 | 3.7 | 3.5 | 3.4 |
|  | Capacitance retention (%) | 100 | 94 | 89 | 88 |
|  | Internal resistance (mΩ) | 230 | 240 | 253 | 276 |
|  | Rate of increase in internal resistance | 1.0 | 1.0 | 1.1 | 1.2 |
|  | Cell thickness (mm) | 0.5800 | 0.5800 | 0.6144 | 0.6200 |
|  | Expansion (mm) | 0.0000 | 0.0000 | 0.0344 | 0.0400 |

Example 7

(Preparation of Electrolyte Solution-7)

Sulfolane, acetonitrile, and $HCF_2CF_2CH_2OCF_2CF_2H$ were mixed at a ratio in volume of 40/40/20 to prepare an electrolyte-salt-dissolving solvent. To this electrolyte-salt-dissolving solvent was added triethyl methylammonium tetrafluoroborate (TEMA)$BF_4$ so as to have a concentration of 1.3 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 1. Then, the obtained electric double layer capacitor was evaluated for its long-term reliability (capacitance retention, rate of increase in internal resistance, expansion coefficient) as follows. Table 5 shows the results.

(1) Capacitance Retention, Rate of Increase in Internal Resistance

The laminated-type capacitor was put into a constant-temperature container at a temperature of 80° C., and then a voltage (2.7 V) was applied thereto for 500 hours to measure the capacitance and internal resistance. The measurement timings were initial (0 hours), 321 hours, and 500 hours. The capacitance retention (%) and rate of increase in internal resistance were calculated based on the obtained measurement values in the same manner as in Example 1.

(2) Measurement of Expansion

Expansion was measured by the same method as in Example 1.

Example 8

(Preparation of Electrolyte Solution-8)

Sulfolane, acetonitrile, and $HCF_2CF_2CH_2OCF_2CF_2H$ were mixed at a ratio in volume of 40/50/10 to prepare an electrolyte-salt-dissolving solvent. To this electrolyte-salt-dissolving solvent was added triethyl methylammonium tetrafluoroborate $(TEMA)BF_4$ so as to have a concentration of 1.3 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 7. The obtained electric double layer capacitor was evaluated for its long-term reliability (capacitance retention, rate of increase in internal resistance, expansion coefficient). Table 5 shows the results.

Example 9

(Preparation of Electrolyte Solution-9)

Sulfolane, acetonitrile, and $HCF_2CF_2CH_2OCF_2CF_2H$ were mixed at a ratio in volume of 5/90/5 to prepare an electrolyte-salt-dissolving solvent. To this electrolyte-salt-dissolving solvent was added triethyl methylammonium tetrafluoroborate $(TEMA)BF_4$ so as to have a concentration of 1.2 mol/l, and the substance was uniformly dissolved into the solvent.

(Production of Laminated Cell Electric Double Layer Capacitor and Evaluation of the Characteristics Thereof)

A laminated cell electric double layer capacitor was produced in the same manner as in Example 7. The obtained electric double layer capacitor was evaluated for its long-term reliability (capacitance retention, rate of increase in internal resistance, expansion coefficient). Table 5 shows the results.

TABLE 5

|  |  | 0 hours (initial) | 321 hours | 500 hours |
|---|---|---|---|---|
| Example 7 | Capacitance (F) | 3.4 | 2.8 | 2.8 |
|  | Capacitance retention (%) | 100 | 83 | 81 |
|  | Internal resistance (mΩ) | 297 | 327 | 392 |
|  | Rate of increase in internal resistance | 1.0 | 1.1 | 1.2 |
| Example 8 | Cell thickness (mm) | 0.5800 | 0.5825 | 0.6200 |
|  | Expansion (mm) | 0.0000 | 0.0250 | 0.0400 |
|  | Capacitance (F) | 3.4 | 2.8 | 2.8 |
|  | Capacitance retention (%) | 100 | 83 | 81 |
|  | Internal resistance (mΩ) | 267 | 300 | 320 |
|  | Rate of increase in internal resistance | 1.0 | 1.1 | 1.2 |
|  | Cell thickness (mm) | 0.5800 | 0.5828 | 0.6205 |
|  | Expansion (mm) | 0.0000 | 0.0280 | 0.0405 |
| Example 9 | Capacitance (F) | 3.4 | 2.8 | 2.8 |
|  | Capacitance retention (%) | 100 | 83 | 81 |
|  | Internal resistance (mΩ) | 250 | 280 | 290 |
|  | Rate of increase in internal resistance | 1.0 | 1.1 | 1.2 |
|  | Cell thickness (mm) | 0.5800 | 0.5838 | 0.6205 |
|  | Expansion (mm) | 0.0000 | 0.0380 | 0.0420 |

The invention claimed is:

1. An electrolyte solution for an electric double layer capacitor, comprising:
   an electrolyte-salt-dissolving solvent (I); and
   an electrolyte salt (II),
   the electrolyte-salt-dissolving solvent (I) containing a fluorine-containing chain ether and a nitrile compound,
   wherein the fluorine-containing chain ether is one or more compounds selected from the group consisting of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$, and $CF_3CF_2CH_2OCH_2CFHCF_3$,
   wherein the electrolyte salt (II) is a triethyl methylammonium salt, a tetraethyl ammonium salt, or a spirobipyridinium salt.

2. The electrolyte solution for an electric double layer capacitor according to claim 1,
   wherein the nitrile compound is a compound represented by the following formula:

$$R^1\text{—}(CN)_n$$

wherein $R^1$ represents a C1-C10 alkyl group or a C1-C10 alkylene group; and n is an integer of 1 or 2.

3. The electrolyte solution for an electric double layer capacitor according to claim 2,
   wherein the nitrile compound is at least one compound selected from the group consisting of acetonitrile, propionitrile, and glutaronitrile.

4. The electrolyte solution for an electric double layer capacitor according to claim 1,
   wherein the ratio in volume between the nitrile compound and the fluorine-containing chain ether is 10/90 to 99/1.

5. An electric double layer capacitor, comprising:
   the electrolyte solution according to claim 1;
   a positive electrode; and
   a negative electrode.

* * * * *